United States Patent
Lee et al.

(10) Patent No.: US 8,857,835 B2
(45) Date of Patent: Oct. 14, 2014

(54) REAR SUSPENSION SYSTEM OF COUPLED TORSION BEAM AXLE

(71) Applicant: Sungwoo Hitech Co., Ltd., Busan (KR)

(72) Inventors: Mun Yong Lee, Busan (KR); Jichan Kim, Yangsan-si (KR)

(73) Assignee: Sungwoo Hitech Co., Ltd., Busan (KR)

( * ) Notice: Subject to any disclaimer, the term of this patent is extended or adjusted under 35 U.S.C. 154(b) by 0 days.

(21) Appl. No.: 13/714,579

(22) Filed: Dec. 14, 2012

(65) Prior Publication Data
US 2014/0125025 A1 May 8, 2014

(30) Foreign Application Priority Data
Nov. 2, 2012 (KR) .................. 10-2012-0123617

(51) Int. Cl.
*B60G 21/05* (2006.01)
*B60G 21/055* (2006.01)

(52) U.S. Cl.
CPC ...... *B60G 21/051* (2013.01); *B60G 2204/1226* (2013.01); *B60G 2204/148* (2013.01); *B60G 2204/43* (2013.01); *B60G 2206/20* (2013.01); *B60G 2206/8201* (2013.01)
USPC ...... 280/124.106; 280/124.107; 280/124.149; 280/124.157

(58) Field of Classification Search
CPC .. B60G 21/052; B60G 21/051; B60G 21/055; B60G 21/0551; B60G 2202/134; B60G 2202/135; B60G 2202/136; B60G 2204/1224; B60G 2204/1226
USPC ............... 280/124.106, 124.107, 124.137, 280/124.149, 124.152, 124.169
See application file for complete search history.

(56) References Cited

U.S. PATENT DOCUMENTS

| | | | | | |
|---|---|---|---|---|---|
| 4,429,900 | A | * | 2/1984 | Feher | 280/124.128 |
| 5,718,445 | A | * | 2/1998 | VanDenberg | 280/676 |
| 6,152,468 | A | * | 11/2000 | Glaser et al. | 280/124.134 |
| 6,533,300 | B1 | * | 3/2003 | Hicks et al. | 280/124.106 |
| 7,556,272 | B2 | * | 7/2009 | Marchel | 280/124.103 |
| 2008/0191443 | A1 | * | 8/2008 | Gabbianelli et al. | 280/124.166 |
| 2010/0059959 | A1 | * | 3/2010 | Kim | 280/124.116 |
| 2012/0211961 | A1 | * | 8/2012 | Zhang et al. | 280/124.116 |

FOREIGN PATENT DOCUMENTS

| | | |
|---|---|---|
| JP | 2004-322913 | 11/2004 |
| JP | 2011194963 A * | 10/2011 |
| KR | 20-0406099 | 1/2006 |
| KR | 10-2010-0029463 | 3/2010 |
| KR | 10-1081141 | 2/2011 |
| KR | 10-2011-0023269 | 3/2011 |
| KR | 10-2012-0046446 | 5/2012 |
| WO | WO 2006092419 A1 * | 9/2006 |

* cited by examiner

*Primary Examiner* — James English
(74) *Attorney, Agent, or Firm* — Lexyoume IP Meister, PLLC

(57) ABSTRACT

The present invention relates to a rear suspension system of a coupled torsion beam which comprises a torsion beam and trailing arms connected to ends of the torsion beam by welding, wherein a gap with a predetermined length is formed between the torsion beam and the trailing arm.

16 Claims, 7 Drawing Sheets

PRIOR ART

PRIOR ART

REAR SUSPENSION SYSTEM OF COUPLED TORSION BEAM AXLE

CROSS-REFERENCE TO RELATED APPLICATION

This application claims priority to and the benefit of Korean Patent Application No. 10-2012-0123617 filed in the Korean Intellectual Property Office on Nov. 2, 2012, the entire contents of which are incorporated herein by reference.

BACKGROUND OF THE INVENTION (a) Field of the Invention

The present invention relates to a rear suspension system of a coupled torsion beam. More particularly, the present invention relates to a rear suspension system of a coupled torsion beam of which a connecting structure of a torsion beam and a trailing arm is improved.

(b) Description of the Related Art

Generally, even though the suspension system of a torsion beam axle type (CTBA; Coupled Torsion Beam Axle) has simple components and narrow performance in a design, it has high driving stability compared to the low production cost and the light mass such that it can be mainly applied to a smaller car and a semi-mid-size car.

In the suspension system of the torsion beam axle type, as shown in FIG. 1, a torsion beam 101 is disposed in width direction of a vehicle body, and a trailing arm 105 that is mounted with a carrier 103 for connecting a wheel and a tire is connected thereto.

Each trailing arm 105 is provided with a shock absorber 107 and a bushing 109 for being connected to a vehicle body and a spring 113 is mounted between a spring seat 111 and the vehicle body.

The wheel moves according to the torsion deformation of the torsion beam 101 in the middle of the suspension system of the torsion beam axle type according to the conventional art, and the wheel is induced to toe-in by the deformation of the torsion beam 101, the position of the trailing arm 105, and the characteristic of the mounting bushing 109.

Referring to FIG. 2, in the rear suspension system of a coupled torsion beam, the trailing arm 105 may be formed by connecting an inner arm 106a and an outer arm 106b by welding to be formed as tubular shape for high performance and light weight.

The torsion beam 101 may be "V" shape and be connected to trailing arm 105 for high performance and light weight.

However, when the rear suspension system of a coupled torsion beam absorbs twisting the torsion beam 101, warping may be generated and thus concentrated stress may be applied to a connecting portion 1 of the torsion beam 101 and the trailing arm 105.

Thus, if the torsion beam 101 is twisted in driving of a vehicle, the warping formed to the connecting portion 1 of the torsion beam 101 and the trailing arm 105 may influence fatigue life of the suspension system.

As solving the problem, increasing thickness where the warping may be applied may be considered, however entire weight of the suspension system is increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a rear suspension system of a coupled torsion beam having advantages of reducing concentrated stress, which may be generated during absorbing twisting of a torsion beam, applied to a connecting portion of a torsion beam and a trailing arm.

A rear suspension system of a coupled torsion beam according to an exemplary embodiment of the present invention may include a torsion beam and trailing arms connected to ends of the torsion beam by welding, wherein a gap with a predetermined length is formed between the torsion beam and the trailing arm.

A cross section of the torsion beam may be shaped as "V".

An attaching portion may be formed to each end of the torsion beam for the trailing arm to be connected thereto.

The gap may be formed between the trailing arm and the attaching portion.

A cross section of the torsion beam may be shaped as "V" and the torsion beam comprises a slanted first surface and a slanted second surface.

The attaching portion supporting the trailing arm may be formed to the first and the second surface of the torsion beam respectively.

A connecting portion may be formed to each end of the torsion beam for connecting the first and the second surface and is connected with an upper portion of the trailing arm, and the connecting portion may be formed as flat.

The attaching portion may include an open portion where the trailing arm is inserted therethrough, a supporting portion faced with the trailing arm, and a protrude portion supporting a lower portion of the trailing arm, and the gap may be formed between the supporting portion and the trailing arm.

The connecting portion and the upper portion of the trailing arm may be connected by welding so as to form a first welding portion, and the protrude portion and the lower portion of the trailing arm may be connected by welding so as to form a second welding portion.

The trailing arm may be formed by connecting an inner arm and an outer arm shaped as "C" respectively by welding so as to form tubular shape.

The rear suspension system may further include a reinforcement bracket, and the reinforcement bracket may be welded to each end of the torsion beam and the trailing arm.

A rear suspension system of a coupled torsion beam according to an exemplary embodiment of the present invention may include a torsion beam and trailing arms connected to ends of the torsion beam by welding, wherein an attaching portion is formed to each end of the torsion beam for the trailing arm to be connected thereto, and a gap is formed between the trailing arm and the attaching portion.

The rear suspension system may further include a reinforcement bracket, and the reinforcement bracket may be welded to each end of the torsion beam and the trailing arm.

The trailing arm may be formed by connecting an inner arm and an outer arm shaped as "C" respectively by welding so as to form tubular shape.

A cross section of the torsion beam may be shaped as "V" and the torsion beam may include a slanted first surface and a slanted second surface, a connecting portion may be formed to each end of the torsion beam for connecting the first and the second surface and be connected with an upper portion of the trailing arm, the connecting portion may be formed as flat, the attaching portion may include an open portion where the trailing arm is inserted therethrough, a supporting portion faced with the trailing arm, and a protrude portion supporting a lower portion of the trailing arm, and the gap may be formed between the supporting portion and the trailing arm.

In exemplary embodiments of the present invention, concentrated stress formed to a connecting portion of the torsion beam and the trailing arm due to warping generated in absorbing twisting of a torsion beam, may be dispersed to the first and the second welding portion through the gap formed between the trailing arm and the attaching portion.

Thus, according to an exemplary embodiment of the present invention, the warping effect generated in absorbing twisting moment between the torsion beam and the trailing arm may be minimized so that fatigue life of the entire suspension system may be improved.

Also, according to an exemplary embodiment of the present invention, since warping stress which would be applied to the connecting portion of the torsion beam and the trailing arm may be disposed to the first and the second welding portion, thus thickness of the torsion beam and the trailing arm may be reduced and weight of the entire suspension system may be reduced.

BRIEF DESCRIPTION OF THE DRAWINGS

The above and other objects, features and advantages of the present invention will be more apparent from the following detailed description in conjunction with the accompanying drawings, in which.

Figure 1:
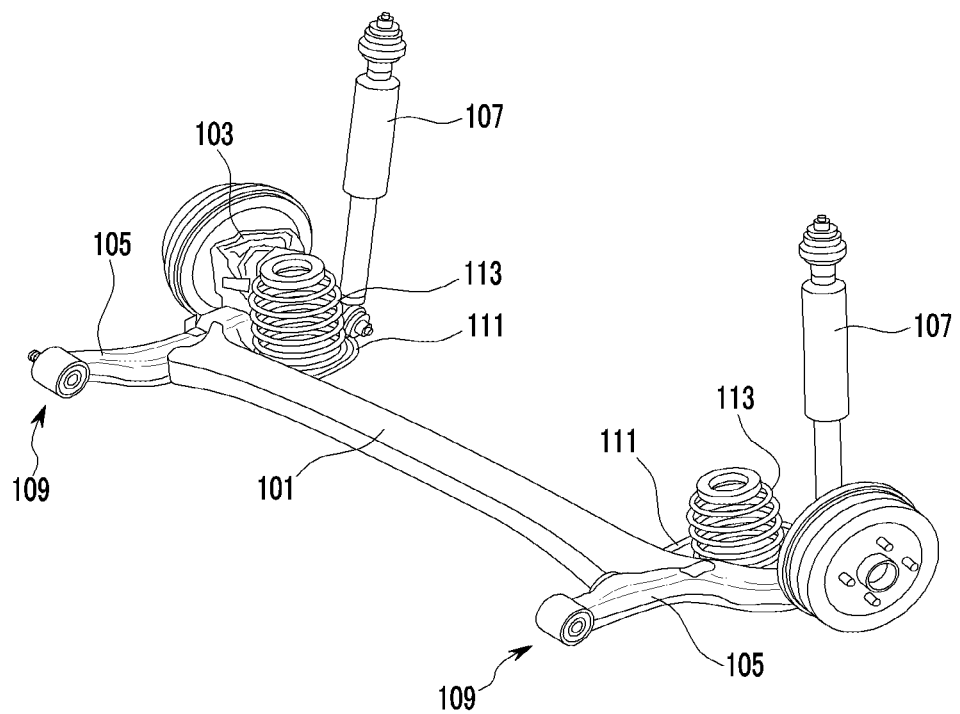
FIG. 1 is a perspective view of a rear suspension system of a coupled torsion beam according to a conventional art.
Figure 2:
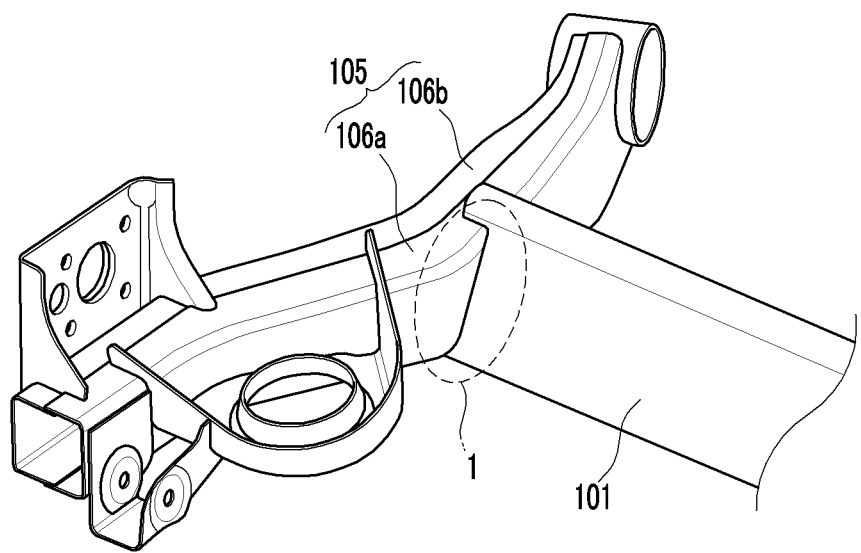
FIG. 2 is a perspective view of a connection structure of a torsion beam and a trailing arm of a rear suspension system of a coupled torsion beam according to a conventional art.

| <Description of symbols> | |
|---|---|
| 10, 110: torsion beam | 11: first surface |
| 12: second surface | 30, 130: trailing arm |
| 31, 131: inner arm | 33, 133: outer arm |
| 50: attaching portion | 51a: open portion |
| 51b: supporting portion | 51c: protrude portion |
| 55: connecting portion | 170: reinforcement bracket |
| G: gap | W1: first welding portion |
| W2: second welding portion | |

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, in the drawings, a size and thickness of each element are randomly represented for better understanding and ease of description, and the present invention is not limited thereto and the thickness of layers, films, panels, regions, etc., are exaggerated for clarity.

In the following detailed description, in order to distinguish constituent elements of the same name, the constituent elements have names of a first, a second, and a third, and the first, the second, and the third are not limited to order thereof.

In the specification, unless explicitly described to the contrary, the word "comprise" and variations such as "comprises" or "comprising", will be understood to imply the inclusion of stated elements but not the exclusion of any other elements.

Figure 3:
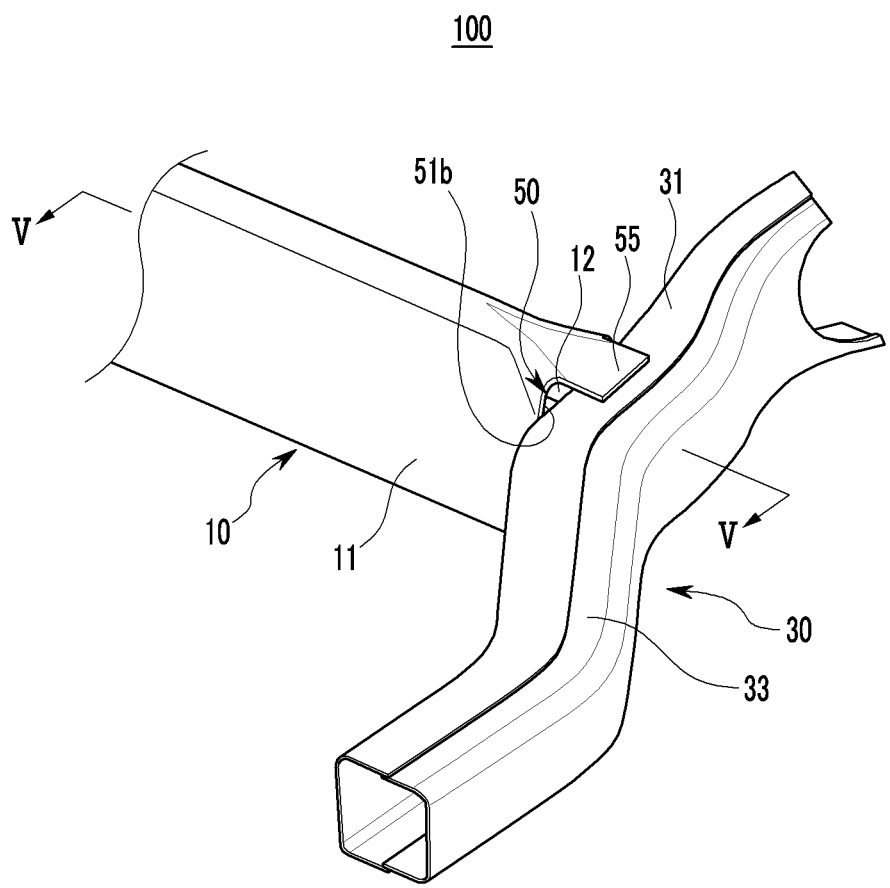
FIG. 3 is a perspective view of a rear suspension system of a coupled torsion beam according to an exemplary embodiment of the present invention.
Figure 4:
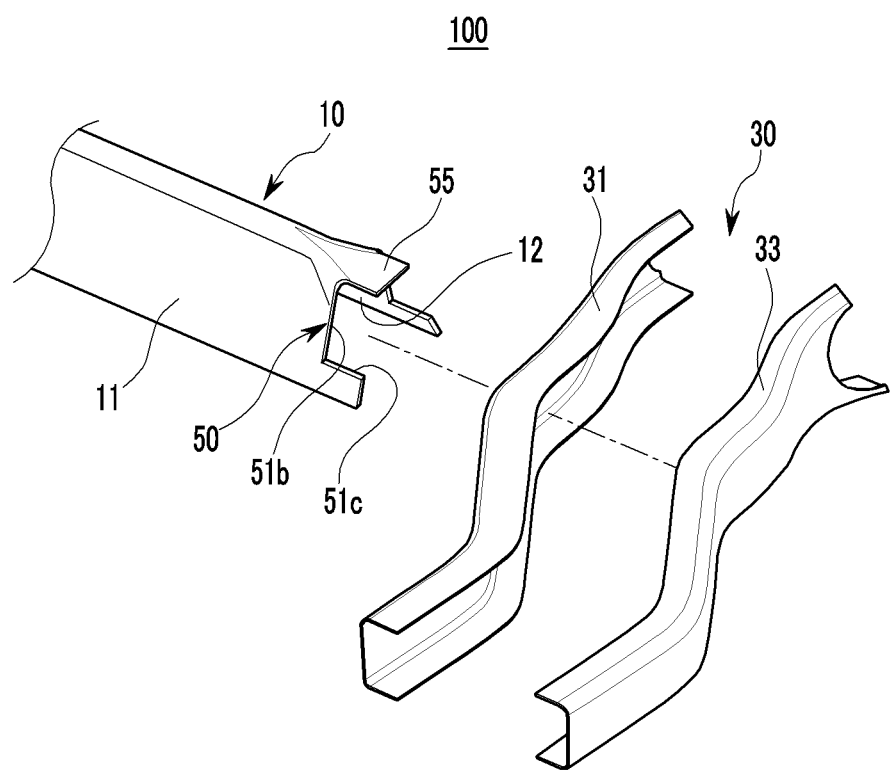
FIG. 4 is an exploded perspective view of FIG. 3.
Figure 5:
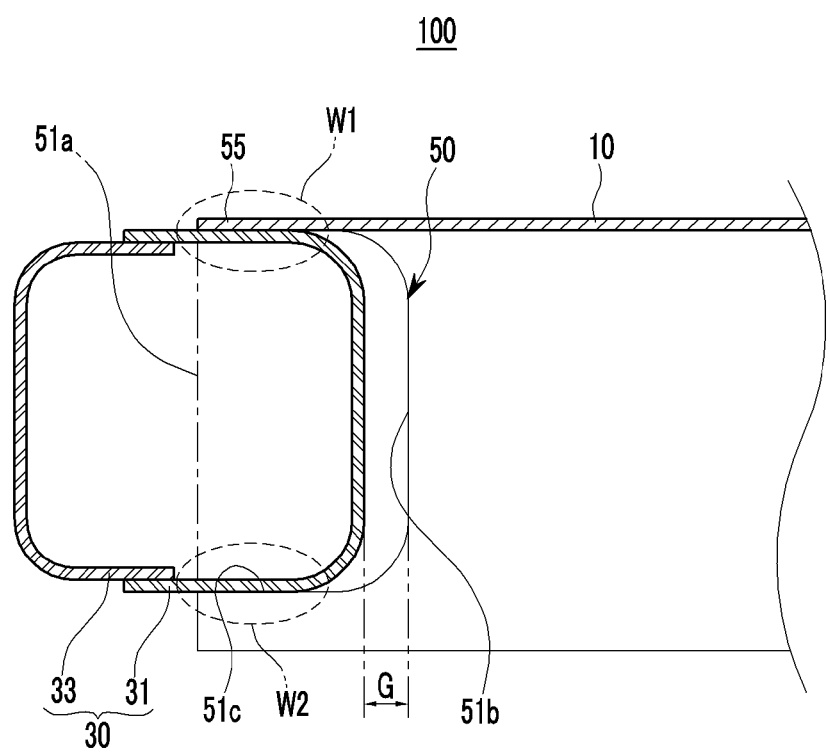
FIG. 5 is cross-sectional view along line V-V of FIG. 3.
Figure 6:
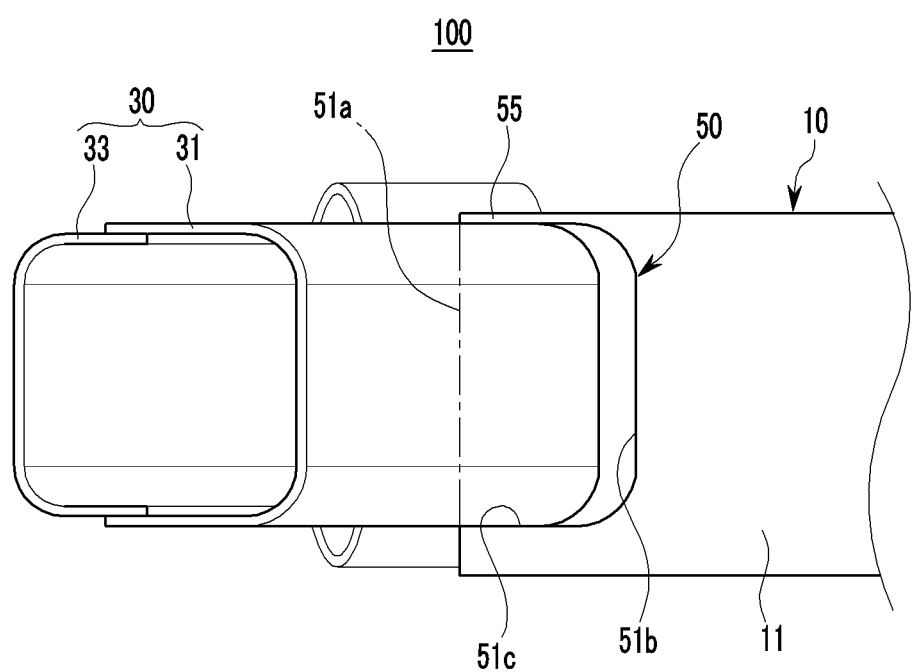
FIG. 6 is front view of FIG. 3.

FIG. 3 is a perspective view of a rear suspension system of a coupled torsion beam according to an exemplary embodiment of the present invention, FIG. 4 is an exploded perspective view of FIG. 3, FIG. 5 is cross-sectional view along line V-V of FIG. 3, and FIG. 6 is front view of FIG. 3.

FIG. 3 to referring to FIG. 6, a rear suspension system of a coupled torsion beam 100 according to an exemplary embodiment of the present invention includes a torsion beam 10 and a trailing arm 30 connected to each end of the torsion beam 10 by welding.

The rear suspension system of the coupled torsion beam 100 according to an exemplary embodiment of the present invention may alleviate warping effect generated in absorbing twisting moment of the torsion beam 10, and thus concentrated stress which may be applied to a connecting portion of the torsion beam 10 and the trailing arm 30 may be minimized A cross section of the torsion beam 10 is shaped as "V". And the torsion beam 10 includes a slanted first surface 11 and a slanted second surface 12.

A bushing case may be mounted to an end of the trailing arm 30 for connecting with a vehicle body, and a plurality of mounting bracket may be mounted to the other end of the trailing arm 30 for mounting a carrier, a spring, a shock absorber and so on.

The trailing arm 30 includes an inner arm 31 and an outer arm 33. That is, the trailing arm 30 is formed by connecting the inner arm 31 and the outer arm 33 shaped as "C" respectively by welding so as to form tubular shape. In this case, a part of the outer arm 33 is inserted into the inner arm 31.

In an exemplary embodiment of the present invention, the inner arm 31 is defined as a portion which is connected to each end of the torsion beam 10 and the outer arm 33 is defined as a portion which is partially inserted into the inner arm 31.

In an exemplary embodiment of the present invention, a predetermined gap G is formed where the torsion beam 10 and trailing arm 30 are connected to each other.

An attaching portion 50 is formed to each end of the torsion beam 10 for supporting the trailing arm 30. The attaching portion 50 may be formed to each end of the first and the second surface 11 and 12 of the torsion beam 10 respectively.

A connecting portion 55 is formed to each end of the torsion beam 10 for connecting the first and the second surface 11 and 12 and is connected with an upper portion of the inner arm 31. The connecting portion 55 may be formed as flat corresponding to a lower portion of the attaching portion 50 for supporting the upper portion of the inner arm 31.

So, the attaching portion 50 may support the upper and lower portion of the trailing arm 30, which is the inner arm 31.

The attaching portion 50 include an open portion 51a where the inner arm 31 is inserted therethrough, a supporting portion 51b faced with the inner arm 31, and a protrude portion 51c supporting a lower portion of the inner arm 31.

The gap G is formed to the connecting portion of the torsion beam 10 and the trailing arm 30, that is, the gap G is formed between the trailing arm 30 and the attaching portion 50. More precisely, the gap G is formed between the supporting portion 51b and a side of the inner arm 31.

In an exemplary embodiment of the present invention, the gap G may be about 3 mm.

The connecting portion 55 and the upper portion of the inner arm 31 are connected by welding so as to form a first welding portion W1 and the protrude portion 51c of the attaching portion 50 and the lower portion of the inner arm 31 are connected by welding so as to form a second welding portion W2.

As described above, according to the rear suspension system of the coupled torsion beam 100 of the exemplary embodiment of the present invention, the attaching portion 50 is formed to each end of the torsion beam 10 for connecting the trailing arm 30 thereto, and the predetermined gap G is formed between the trailing arm 30 and the attaching portion 50.

So, in exemplary embodiments of the present invention, concentrated stress, formed to a connecting portion of the torsion beam 10 and the trailing arm 30 due to the warping effect generated in absorbing twisting of the torsion beam 10, may be dispersed to the first and the second welding portion W1 and W2 through the gap G formed between the trailing arm 30 and the attaching portion 50.

Thus, the warping effect generated in absorbing twisting moment generated in the connecting portion of the torsion beam 10 and the trailing arm 30 may be minimized so that fatigue life of the entire suspension system 100 may be improved.

Also, according to the exemplary embodiment of the present invention, since warping stress which would be applied to the connecting portion of the torsion beam 10 and the trailing arm 30 may be disposed to the first and the second welding portion W1 and W2, thus thickness of the torsion beam 10 and the trailing arm 30 may be reduced and weight of the entire suspension system 100 may be reduced.

Figure 7:
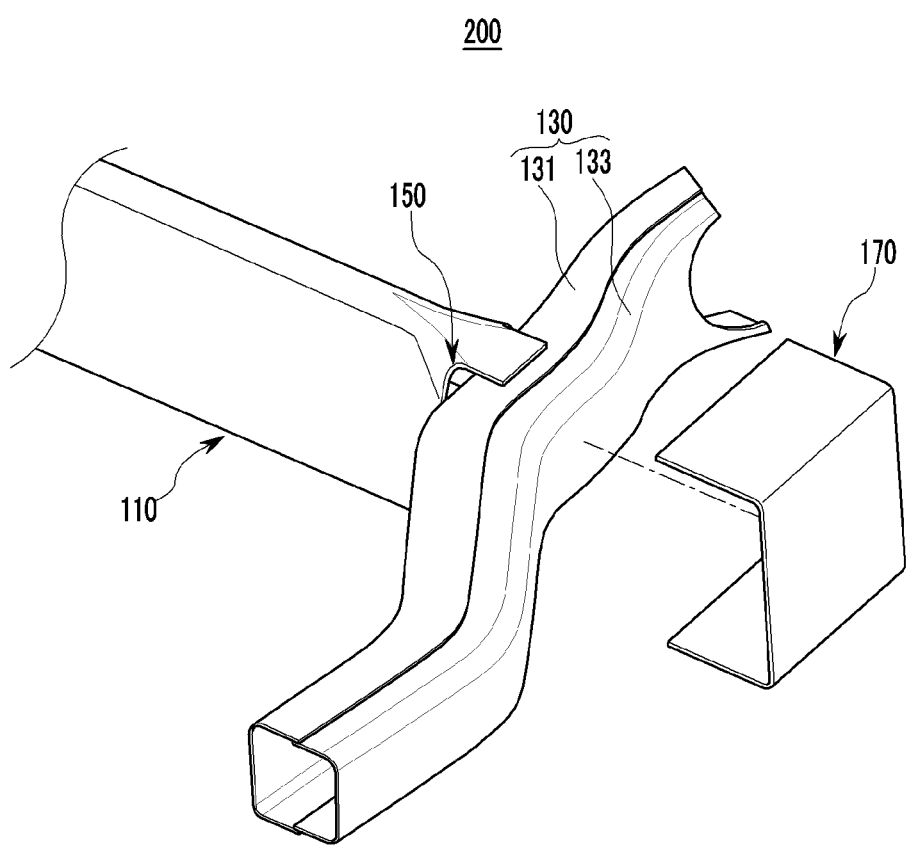
FIG. 7 is an exploded perspective view of a rear suspension system of a coupled torsion beam according to a modified exemplary embodiment of the present invention.

FIG. 7 is an exploded perspective view of a rear suspension system of a coupled torsion beam according to a modified exemplary embodiment of the present invention.

Referring to FIG. 7, a rear suspension system of a coupled torsion beam 200 according to a modified exemplary embodiment of the present invention further includes a reinforcement bracket 170 which is connected to each end of a torsion beam 110 and a trailing arm 130.

The reinforcement bracket 170 is connected to each end of the torsion beam 110 and the trailing arm 130 by welding. The reinforcement bracket 170 is formed as "C" shape, and supports each end of the trailing arm 130 and the torsion beam 110.

The reinforcement bracket 170 wraps an outer arm 133 and an inner arm 131 and is connected to each end of the torsion beam 110 and the outer arm 133 and the inner arm 131 by welding.

Because the reinforcement bracket 170 is connected to each end of the torsion beam 110 and the outer arm 133 and the inner arm 131 by welding, concentrated stress formed to a connecting portion of the torsion beam 110 and the trailing arm 130 due to warping generated in absorbing twisting of the torsion beam 110, may be dispersed to the first and the second welding portion W1 and W2 more smoothly. Thus, the warping effect generated in absorbing twisting moment generated in the connecting portion of the torsion beam 110 and the trailing arm 130 may be minimized so that fatigue life of the entire suspension system 200 may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rear suspension system comprising:
   a torsion beam extending in a horizontal direction and having two ends; and
   a pair of trailing arms, each of the pair of trailing arms being connected to a corresponding end of the torsion beam by welding such that each of the connected pair of trailing arms is generally extended in a vertical direction with respect to the horizontal direction,
   wherein each of the pair of trailing arms is connected to the corresponding end of the torsion beam by being inserted in the horizontal direction such that a gap with a predetermined length is formed in the horizontal direction between each end of the torsion beam and a corresponding one of the pair of trailing arms.

2. The rear suspension system of claim 1, wherein a cross section of the torsion beam is shaped as "V".

3. The rear suspension system of claim 2, wherein an attaching portion is formed to each end of the torsion beam to receive the corresponding one of the pair of trailing arms in the horizontal direction.

4. The rear suspension system of claim 3, wherein the gap is formed between each of the pair of trailing arms and the attaching portion.

5. The rear suspension system of claim 3, wherein a cross section of the torsion beam is shaped as "V" and the torsion beam comprises a slanted first surface and a slanted second surface.

6. The rear suspension system of claim 5, wherein the attaching portion supporting a corresponding one of the pair of trailing arms is formed to each of the first surface and the second surface of the torsion beam.

7. The rear suspension system of claim 6, wherein:
   a connecting portion is formed to each end of the torsion beam for connecting the first surface and the second surface and is connected with an upper portion of a corresponding one of the pair of trailing arms; and
   the connecting portion is formed as flat.

8. The rear suspension system of claim 7, wherein:
   the attaching portion comprises:
      an open portion where a corresponding one the pair of trailing arms is inserted therethrough,
      a supporting portion faced with a corresponding one of the pair of trailing arms, and
      a protrude portion supporting a lower portion of the corresponding one of the pair of trailing arms; and
   the gap is formed between the supporting portion and the corresponding one of the pair of trailing arms.

9. The rear suspension system of claim 8, wherein:
   the connecting portion and the upper portion of the corresponding one of the pair of trailing arms are connected by welding so as to form a first welding portion; and
   the protrude portion and the lower portion of the corresponding one of the pair of trailing arms are connected by welding so as to form a second welding portion.

10. The rear suspension system of claim 9, wherein each of the pair of trailing arms is formed by connecting an inner arm and an outer arm shaped as "C" respectively by welding so as to form a tubular shape.

11. The rear suspension system of claim 10,
   further comprising a reinforcement bracket,
   wherein the reinforcement bracket is welded to each end of the torsion beam and a corresponding one of the pair of trailing arms.

12. A rear suspension system comprising:
a torsion beam extending in a horizontal direction and having two ends; and
a pair of trailing arms, each of the pair of trailing arms being connected to a corresponding end of the torsion beam by welding such that each of the connected pair of trailing arms is generally extended in a vertical direction with respect to the horizontal direction,
wherein an attaching portion is formed to each end of the torsion beam to receive a corresponding one of the pair of trailing arms in the horizontal direction, and a gap is formed in the horizontal direction between the corresponding one of the pair of trailing arms and the attaching portion when the pair of trailing arms is connected to the torsion beam.

13. The rear suspension system of claim 12,
further comprising a reinforcement bracket,
wherein the reinforcement bracket is welded to each end of the torsion beam and the corresponding one of the pair of trailing arms connected to the end of the torsion beam.

14. The rear suspension system of claim 13, wherein the reinforcement bracket is formed as "C" shape, and supports the corresponding one of the pair of trailing arms and each end of the torsion beam.

15. The rear suspension system of claim 13, wherein:
a cross section of the torsion beam is shaped as "V" and the torsion beam comprises a slanted first surface and a slanted second surface;
a connecting portion is formed to each end of the torsion beam for connecting the first surface and the second surface and is connected with an upper portion of a corresponding one of the pair of trailing arms;
the connecting portion is formed as flat;
the attaching portion comprises an open portion configured to receive the corresponding one of the pair of trailing arms in the horizontal direction, a supporting portion facing the corresponding one of the pair of trailing arms in the horizontal direction, and a protrude portion protruded in the horizontal direction and configured to support a lower portion of the corresponding one of the pair of trailing arms; and
the gap is formed between the supporting portion of the attaching portion and the corresponding one of the pair of trailing arms.

16. A rear suspension system comprising:
a torsion beam extending in a horizontal direction and having two ends;
a pair of trailing arms, each of the pair of trailing arms being connected to a corresponding end of the torsion beam by welding such that each of the connected pair of trailing arms is generally extended in a vertical direction with respect to the horizontal direction; and
a pair of reinforcement brackets, each of the pair of reinforcement brackets welded to each end of the torsion beam and a corresponding one of the pair of trailing arms connected to the end of the torsion beam,
wherein:
the torsion beam is shaped to have an attaching portion at each end of the torsion beam to receive the corresponding one of the pair of trailing arms in the horizontal direction via the attaching portion;
the attaching portion comprises an open portion configured to receive the corresponding one of the pair of trailing arms in the horizontal direction, a supporting portion facing the corresponding one of the pair of trailing arms in the horizontal direction, and a protrude portion protruded in the horizontal direction and configured to support a lower portion of the corresponding one of the pair of trailing arms;
a gap is formed in the horizontal direction between the supporting portion of the attaching portion and the corresponding one of the pair of trailing arms when the pair of trailing arms is connected to the torsion beam; and
each of the pair of reinforcement brackets is connected to the corresponding end of the torsion beam and the corresponding one of the pair of trailing arms such that the pair of trailing arms passes through respectively corresponding holes formed by the pair of reinforcement brackets and the torsion beam.

\* \* \* \* \*